(12) United States Patent
Gunji

(10) Patent No.: US 12,468,149 B2
(45) Date of Patent: Nov. 11, 2025

(54) OPTICAL ELEMENT INCLUDING LIGHT SHIELDING REGIONS AND PINHOLES

(71) Applicant: Magnolia White Corporation, Tokyo (JP)

(72) Inventor: Masakazu Gunji, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 636 days.

(21) Appl. No.: 17/726,587

(22) Filed: Apr. 22, 2022

(65) Prior Publication Data

US 2022/0373792 A1 Nov. 24, 2022

(30) Foreign Application Priority Data

May 20, 2021 (JP) ................................ 2021-085272

(51) Int. Cl.
*G02B 27/00* (2006.01)
*G06F 3/01* (2006.01)
*H04N 23/21* (2023.01)
*G02F 1/00* (2006.01)

(52) U.S. Cl.
CPC ......... *G02B 27/0093* (2013.01); *G06F 3/013* (2013.01); *H04N 23/21* (2023.01); *G02B 27/00* (2013.01); *G02F 1/00* (2013.01)

(58) Field of Classification Search
CPC ........................... G02B 27/0093; G02B 27/00; G02B 27/0172; G02B 5/005; G02B 2027/0138; G06F 3/013; G06F 3/011; G06F 1/00; H04N 5/33; H04N 23/21; H05B 33/12
See application file for complete search history.

(56) References Cited

U.S. PATENT DOCUMENTS

| 10,732,771 B2 * | 8/2020 | Yang ................. G06V 40/1306 |
| 10,763,296 B2 * | 9/2020 | Lin ........................ H01L 31/16 |
| 2015/0235473 A1 * | 8/2015 | Schowengerdt ....... G02B 5/005 345/633 |
| 2020/0104562 A1 * | 4/2020 | Sung ................. H01L 27/14605 |

(Continued)

FOREIGN PATENT DOCUMENTS

| JP | 2003-273342 A | 9/2003 |
| JP | 2015-230177 A | 12/2015 |

(Continued)

OTHER PUBLICATIONS

Japanese Office Action dated Apr. 1, 2025 for the corresponding Japanese Patent Application No. 2021-085272, with English machine translation.

(Continued)

*Primary Examiner* — Ida M Soward
(74) *Attorney, Agent, or Firm* — Michael Best & Friedrich LLP

(57) ABSTRACT

In an optical device, a center position of a pinhole is disposed at a center position of a sensor region, in a first individual region disposed in a center region, of a plurality of first individual regions, and a distance in planar view between a center region of the sensor region and the pinhole in the first individual region far from the center region is longer than a distance in planar view between the center region of the sensor region and the pinhole in the first individual region close to the center region in the first individual regions disposed in the peripheral region.

6 Claims, 6 Drawing Sheets

(56) References Cited

U.S. PATENT DOCUMENTS

| | | | | |
|---|---|---|---|---|
| 2020/0219915 A1* | 7/2020 | Kim | .................... | H10F 39/8057 |
| 2020/0219948 A1* | 7/2020 | Kim | ....................... | H10K 59/65 |
| 2020/0380239 A1* | 12/2020 | Lee | ....................... | H10K 59/65 |
| 2020/0394371 A1* | 12/2020 | Chai | .................... | G06F 3/0416 |
| 2020/0395433 A1* | 12/2020 | Sung | .................... | H10K 59/131 |
| 2021/0097252 A1* | 4/2021 | Lee | ......................... | G06F 3/041 |
| 2022/0344391 A1 | 10/2022 | Hatsumi et al. | | |

FOREIGN PATENT DOCUMENTS

| | | | | |
|---|---|---|---|---|
| WO | 2020/065442 A1 | 4/2020 | | |
| WO | WO-2020226021 A1 * | 11/2020 | ............. | H04N 25/70 |

OTHER PUBLICATIONS

Japanese Office Action mailed on Sep. 9, 2025 for the corresponding Japanese Patent Application No. 2021-085272, with English machine translation.

\* cited by examiner

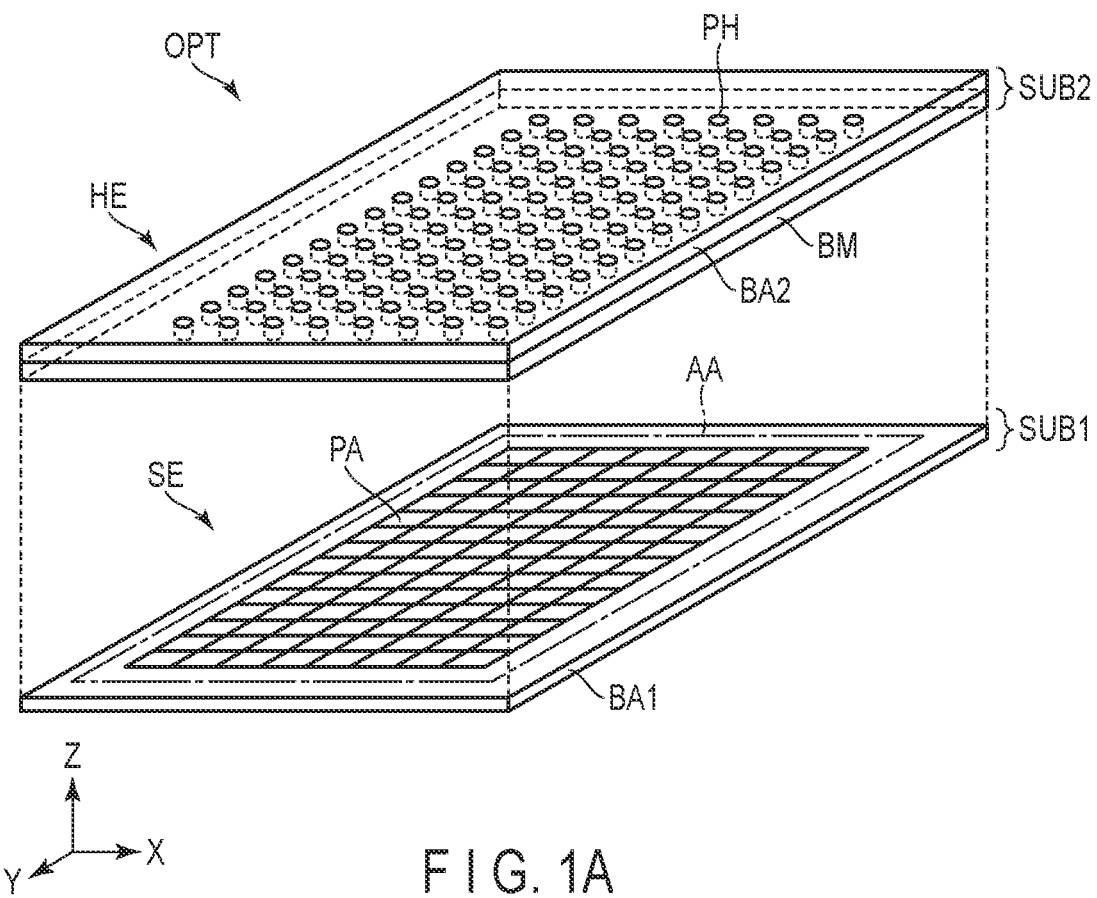
FIG. 1A
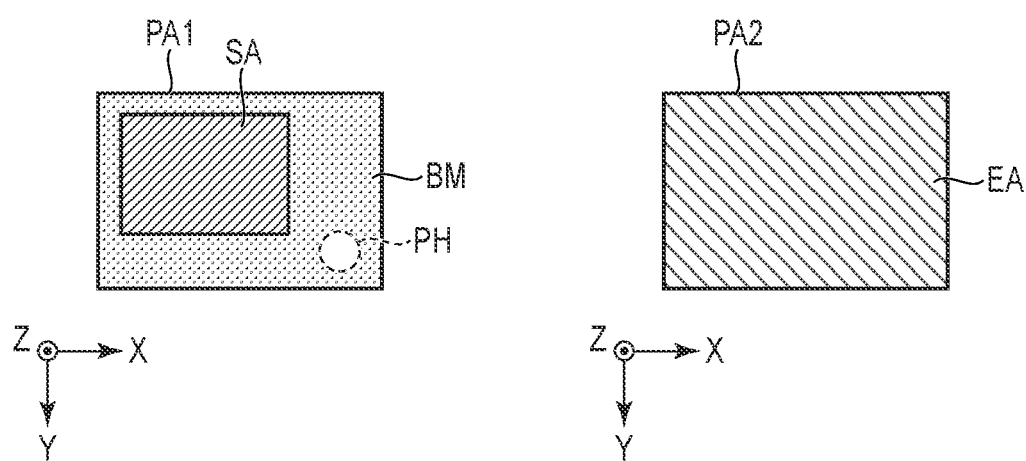
FIG. 1B                     FIG. 1C

OPTICAL ELEMENT INCLUDING LIGHT SHIELDING REGIONS AND PINHOLES

CROSS-REFERENCE TO RELATED APPLICATIONS

This application is based upon and claims the benefit of priority from Japanese Patent Application No. 2021-085272, filed May 20, 2021, the entire contents of which are incorporated herein by reference.

FIELD

Embodiments described herein relate generally to an optical element and an electronic device.

BACKGROUND

An electronic device including a light-receiving element and a light-emitting element has been developed.

BRIEF DESCRIPTION OF THE DRAWINGS

FIG. 1A is a view illustrating an optical element of the embodiment.
FIG. 1B is a view illustrating the optical element of the embodiment.
FIG. 1C is a view illustrating the optical element of the embodiment.

DETAILED DESCRIPTION

Figure 2:
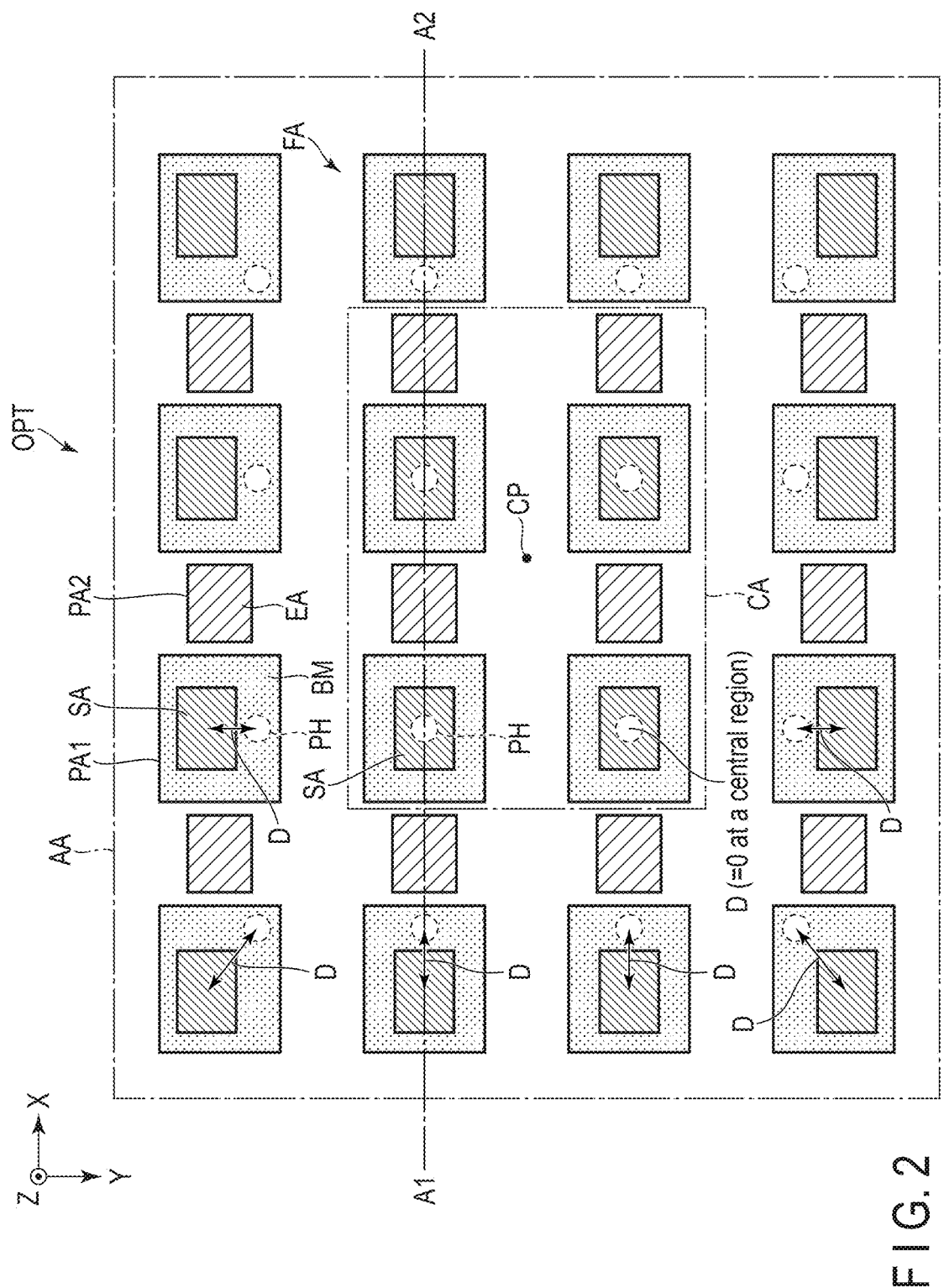
FIG. 2 is a plan view showing the optical element.

In general, according to one embodiment, an optical device comprising: a first substrate; a second substrate provided to overlap the first substrate; a plurality of light emitting regions for emitting near-infrared light, on the first substrate; a plurality of sensor regions for detecting the near-infrared light, on the first substrate; a light shielding region, and a plurality of pinholes provided in the light shielding region, on the second substrate; a plurality of first individual regions each including one of the plurality of sensor regions, the light shielding region, and one of the plurality of pinholes; and a plurality of second individual regions each including one of the plurality of light emitting regions, wherein the plurality of first individual regions and the plurality of second individual regions are disposed alternately, a center position of the pinhole are disposed at a center position of the sensor region, in the first individual region disposed in a center region of the plurality of first individual regions, the pinhole are not overlapped the sensor region, in the first individual region disposed in a peripheral region different from the center region of the plurality of first individual regions, and a distance in planar view between a center region of the sensor region and the pinhole in the first individual region far from the center region is longer than a distance in planar view between the center region of the sensor region and the pinhole in the first individual region close to the center region, in the first individual regions disposed in the peripheral region.

According to the embodiment, an optical element and an electronic device capable of detecting changes in the direction of the line of sight can be provided.

Each of embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

An optical element according to one of the embodiments will be described hereinafter with reference to the accompanying drawings.

In the embodiment, a first direction X, a second direction Y, and a third direction Z are orthogonal to each other, but may intersect at an angle other than 90 degrees. A direction toward a tip of an arrow indicating the third direction Z is referred to as an upper or upward direction, and a direction opposite to the direction toward the tip of the arrow indicating the third direction Z is referred to as a lower or downward direction.

In addition, expressions such as "a second member above a first member" and "a second member under a first member" mean that the second member may be in contact with the first member or may be located separately from the first member. In the latter case, a third member may be interposed between the first member and the second member. In contrast, according to "a second member above a first member" and "a second member under a first member", the second member may be in contact with the first member.

In addition, an observation position at which the liquid crystal display device is to be observed is assumed to be located on the tip side of the arrow indicating the third direction Z, and viewing from the observation position toward an X-Y plane defined by the first direction X and the second direction Y is referred to as planar view. Viewing a cross-section of the liquid crystal display device on an X-Z plane defined by the first direction X and the third direction Z or a Y-Z plane defined by the second direction Y and the third direction Z is referred to as cross-sectional view.

Embodiment

FIGS. 1A through 1C illustrate an optical element of the embodiment. FIG. 1A is an exploded perspective view of an optical element OPT. The optical element OPT includes a sensor element part SE and an optical path adjustment part HE.

The sensor element part SE includes a base material BA1 and a plurality of individual regions PA. The plurality of individual regions PA are provided in an active region AA of the base material BA1. The sensor element part SE is also referred to as a first substrate SUB1.

The optical path adjustment part HE includes a base material BA2, and a light-shielding layer BM provided with a plurality of pinholes PH. The optical path adjustment part HE is also referred to as a second substrate SUB2.

As shown in FIG. 1B, the individual regions PA include individual regions PA1 and PA2. The individual region PA1 includes a sensor region SA. The light-shielding layer BM and the pinhole PH of the optical path adjustment part HE are provided to overlap the individual region PA1 of the sensor element part SE. The individual region PA2 includes a light-emitting region EA. The individual regions PA1 and PA2 are also referred to as a first individual region and a second individual region, respectively.

FIG. 2 is a plan view showing the optical element. In FIG. 2, the plurality of individual regions PA1 and PA2 are disposed alternately. A center position of the pinhole PH is located at the center of the sensor region SA, in the individual region PA1 provided in a central region CA of the active region AA, of the plurality of individual regions PAL In FIG. 2, sixteen individual regions PA1 and twelve individual regions PA2 are disposed, but the numbers of individual regions PA1 and PA2 are not limited to these.

In addition, the individual regions PA1 and PA2 may not be disposed alternately. For example, one individual region PA2 may be disposed for two individual regions PAL The number of individual regions PA1 for the individual regions PA2 can be determined as appropriate in accordance with the sensitivity of the sensor regions SA.

The pinholes PH do not overlap the sensor regions SA, in the individual regions PA1 provided in a peripheral region FA located remote from the central region CA. The distance "D" (referred to as an offset amount "D") between the center position of the sensor region SA and the center position of the pinhole PH becomes longer toward the periphery.

That is, the offset amount "D" is 0 (zero) in the central region CA, but is larger toward the periphery in the peripheral region FA.

In other words, as the distance of the individual region PA1 to a center point CP of the active region AA is longer, the distance between the center position of the sensor region SA and the center position of the pinhole PH becomes longer. In the individual region PA1 where the distance to the center point CP of the active region AA is the same, however, the distance from the center position CP of the active region AA to the center position of the pinhole PH is desirably equal.

In other words, it can be said that, in the individual region PA1 located in the peripheral region FA, the distance in planar view between the center position of the sensor region SA and the pinhole PH in the individual region PA1 far from the central region CA is longer than the distance in planar view between the center region of the sensor region SA and the pinhole PH in the individual region PA1 close to the center region CA.

Figure 3A:
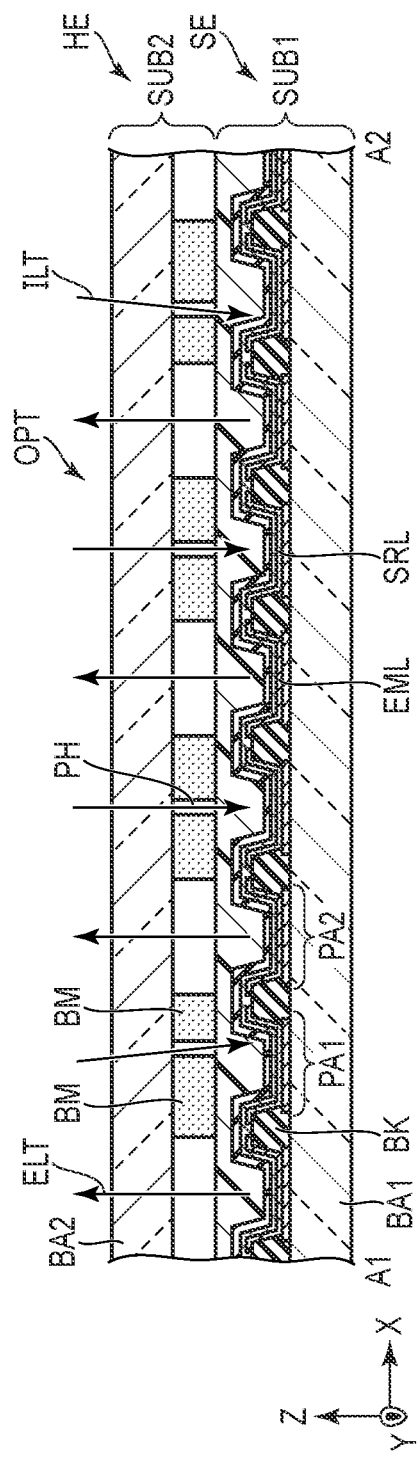
FIG. 3A is a cross-sectional view showing the optical element.
Figure 3B:
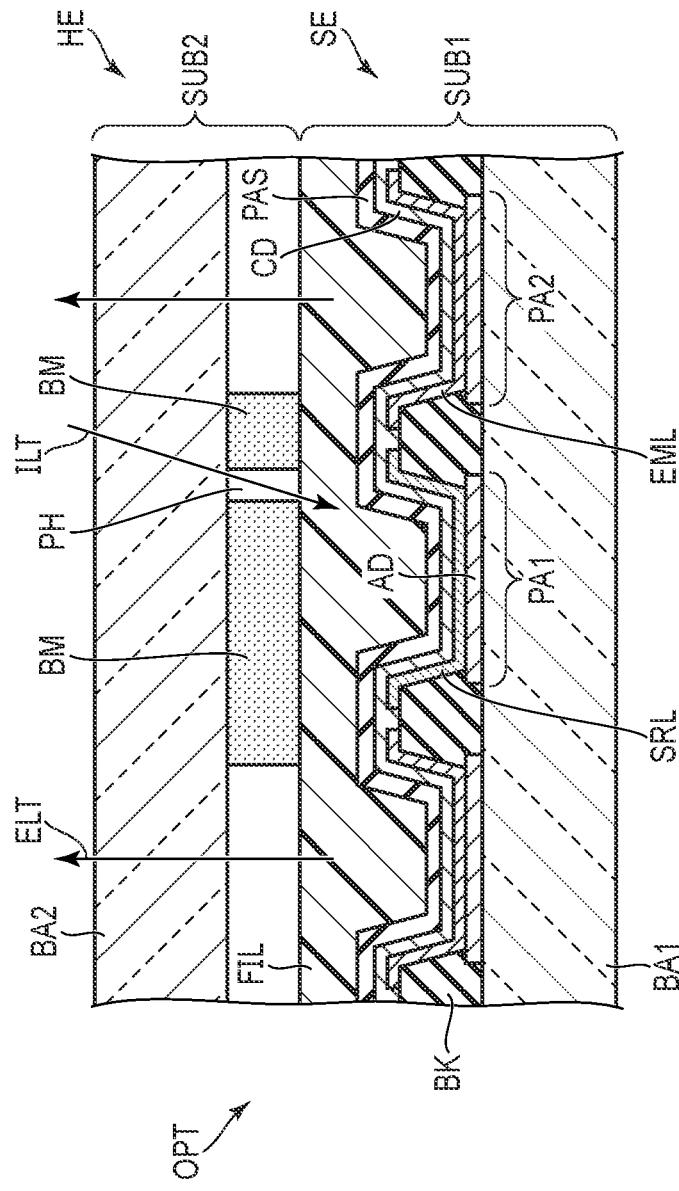
FIG. 3B is a cross-sectional view showing the optical element.

FIG. 3A and FIG. 3B are cross-sectional views showing the optical element. FIG. 3A is a cross-sectional view showing the optical element OPT as viewed along line A1-A2 in FIG. 2. FIG. 3B is a partially enlarged view of FIG. 3A.

The optical element OPT shown in FIG. 3 includes the substrate SUB1 and the second substrate SUB2. The first substrate SUB1 includes a base material BA1, an anode AD, an light emitting layer EML, a sensor layer SRL, a cathode CD, an insulating layer PAS, and an insulating layer FIL. The second substrate SUB2 includes the base material BA2, the light-shielding layer BM and the pinhole PH as described above.

The base materials BA1 and BA2 are transparent base materials. The materials of the base materials BA1 and BA2 are, for example, glass, or resin materials composed of, for example, acrylic, and polyimide.

The anode AD is provided on the base material BA1. The anode AD is formed by a stacked layer body of a transparent conductive layer and a metal layer. The material of the transparent conductive layer is, for example, a translucent metal oxide such as indium tin oxide (ITO) or indium zinc oxide (IZO). For example, silver or silver alloy can be used as the material of the metal layer.

A plurality of banks BK (also referred to as ribs) are provided on the substrate BA1 so as to overlap a part of the anode AD. The banks BK are protruding portions formed by the organic insulating layer. A resin material such as acrylic resin or polyimide resin is used as the organic insulating layer of the banks BK. The area between the adjacent banks BK corresponds to the individual region PA.

Although not shown in the figure, a drive element of the individual region PA, for example, a thin-film transistor may be provided between the base material BA1 and the banks BK.

In the individual region PA1, the sensor layer SRL is provided between the adjacent banks BK so as to overlap the anode AD. The sensor layer SRL detects, for example, near-infrared light, more specifically, light having a wavelength of approximately 800 nm. In the embodiment, an organic photodiode material is used as the material of the sensor layer SRL. The sensor layer SRL is often referred to as an OPD layer. More specifically, the sensor layer SRL is a photoelectric conversion layer capable of photoelectrically converting near-infrared light.

In the individual region PA2, the light emitting layer EML is provided in the region between the adjacent banks BK so as to overlap the anode AD. The light emitting layer EML emits, for example, near-infrared light, more specifically, light having a wavelength of approximately 800 nm. In the embodiment, an organic electroluminescent light-emitting material is used as the material of the light emitting layer EML. The light emitting layer EML is often referred to as an organic EL layer or an OLED layer.

A cathode CD is provided on the sensor layer SRL and the light emitting layer EML. The material of the cathode CD is, for example, a conductive layer containing an alkali metal or alkaline earth metal. For example, magnesium (Mg), lithium (Li), or the like can be used as the alkali metal or alkaline earth metal. In the embodiment, an MgAg film that is an alloy of magnesium and silver is used as the cathode CD. The cathode CD is provided over a plurality of individual regions PA.

The insulating layer PAS is provided on the cathode CD. An inorganic material such as silicon oxide, silicon nitride, or silicon oxynitride can be used as the material of the insulating layer PAS. Entry of water and the like from the outside and deterioration of the light emitting layer EML and the sensor layer SRL can be prevented by the insulating layer PAS.

The insulating layer FIL is provided to cover the insulating layer PAS. For example, a resin material such as acrylic resin or polyimide resin can be used as the material of the insulating layer FIL. Unevenness of the first substrate SUB1 caused by the banks BK can be flattened by the insulating layer FIL.

The electrode provided in the lower layer serves as the anode AD and the electrode provided in the upper layer serves as the cathode CD, and may be vice versa depending on the stacked structure of the sensor layer SRL and the light emitting layer EML. More specifically, the electrode provided in the lower layer may be formed as the cathode CD, and the electrode provided in the upper layer may be formed as the anode AD.

The light-shielding layer BM of the second substrate SUB2 is formed of, for example, a material obtained by mixing a resin material with black pigment. In the embodiment, a region where the light-shielding layer BM is provided in the individual region PA1 is also referred to as the light shielding region.

The pinhole PH is a through hole provided in the light-shielding layer BM. One pinhole PH is provided in each individual region PAL In the individual region PA2, light ELT emitted from the light emitting layer EML is emitted onto the upper surface of the optical element OPT.

In contrast, the light ILT is made incident on the sensor layer SRL through the pinhole PH provided in the light-shielding layer BM, in the individual region PAL The incidence of the near-infrared light ILT is converted into an electric signal by photoelectric conversion, in the sensor layer SRL. The incidence of the near-infrared light ILT can be detected by outputting the electric signal. The sensor layer SRL is often referred to as a light-receiving layer or photoelectric conversion layer.

As described above, the light ILT is made incident in the pinhole PH located in the central region CA, in a direction opposite to the third direction Z, i.e., vertically from the above.

The center of the pinhole PH located in the peripheral region FA is off the center of the sensor region SA. For this reason, the light ILT is made incident in the pinhole PH located in the peripheral region FA, at an angle making inclination to the third direction, i.e., from a direction of inclination.

Figure 4A:
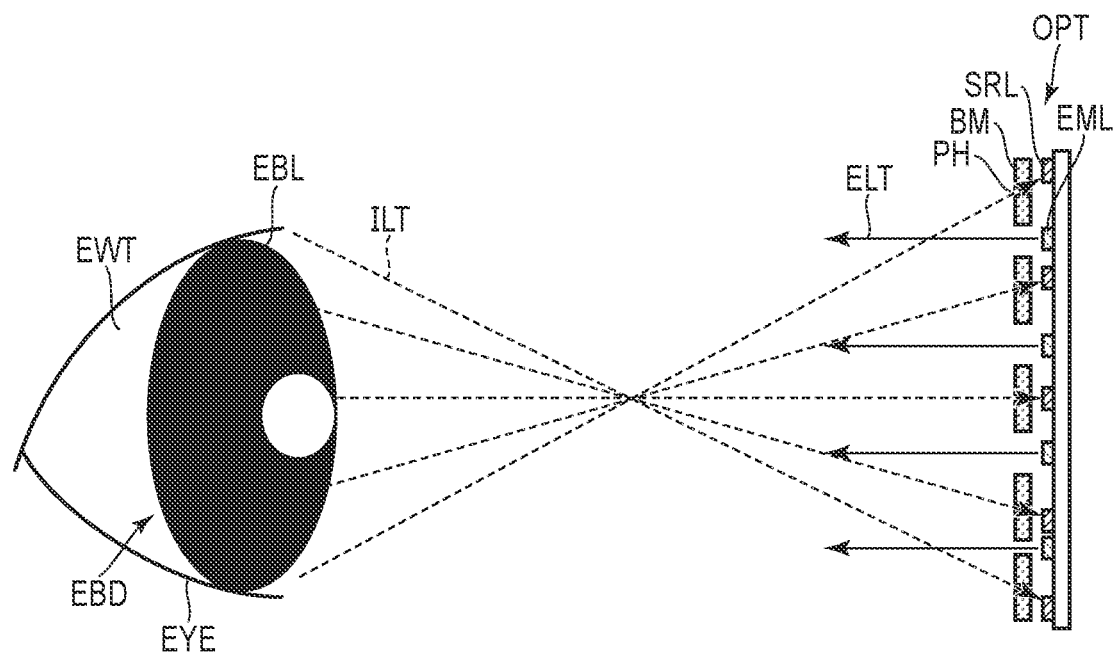
FIG. 4A is a view showing a positional relationship of the optical element.
Figure 4B:
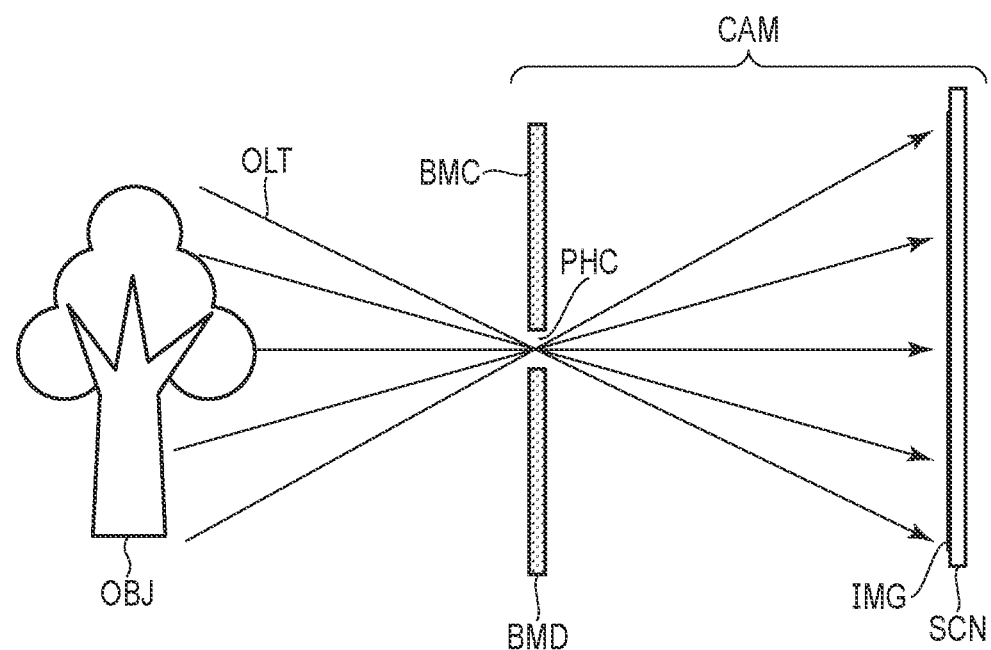
FIG. 4B is a view showing a positional relationship of the optical element.

FIG. 4A and FIG. 4B are views showing the positional relationship of the optical element. FIG. 4A is a view illustrating a positional relationship among the optical element OPT, an eyeball EYE, light ILT, and light ELT. FIG. 4B is a view illustrating a principle of a pinhole camera.

As shown in FIG. 4A, the near-infrared light ELT is emitted from the light emitting layer EML of the optical element OPT toward the eyeball EYE. The light ELT is reflected on the surface of the eyeball EYE and, for example, the light ILT including positional information of an iris EBL and the like travels toward the sensor layer SRL.

The principle of the pinhole camera will be described with reference to FIG. 4B. The pinhole camera CAM shown in FIG. 4B includes a light-shielding portion BMC, a pinhole PHC provided in the light-shielding portion BMC, and a screen SCN. When external light OLT is made incident on the pinhole camera CAM, the only light reaching the pinhole PHC can pass through the pinhole PH. An image IMG of a subject OBJ can be thereby obtained on the screen SCN.

It is assumed that, in the optical element OPT of the embodiment, the light ILT travels in the same optical path as the external light OLT made incident through the pinhole PHC of the pinhole camera CAM. The only light ILT traveling in this optical path passes through the pinhole PH of the optical element OPT.

The light ILT that has passed through the pinhole PH is made incident on the sensor layer SRL. The light ILT is photoelectrically converted by the sensor layer SRL, and the positional information of the iris EBL, and the like are output as electrical information.

A distance between the optical element OPT and the eyeball EYE is fixed to a predetermined distance. The pinhole PH provided in each individual region PA is located on the optical path, based on the predetermined distance and the position of the sensor layer ERL.

For example, when the position of the iris EBL is changed, change of a position of a boundary EBD between the iris EBL and a white part of eye EWT is detected by the sensor layer SRL via the light ILT. Change of the line of sight to an upward direction or a downward direction can be thereby detected.

Figure 5A:
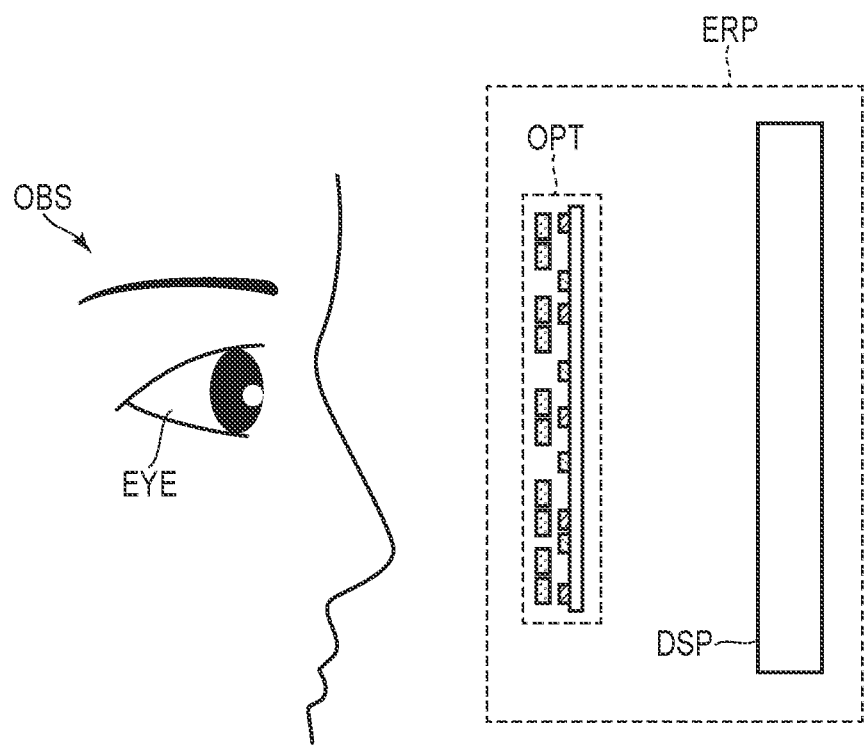
FIG. 5A is a view showing an application example of the optical element.
Figure 5B:
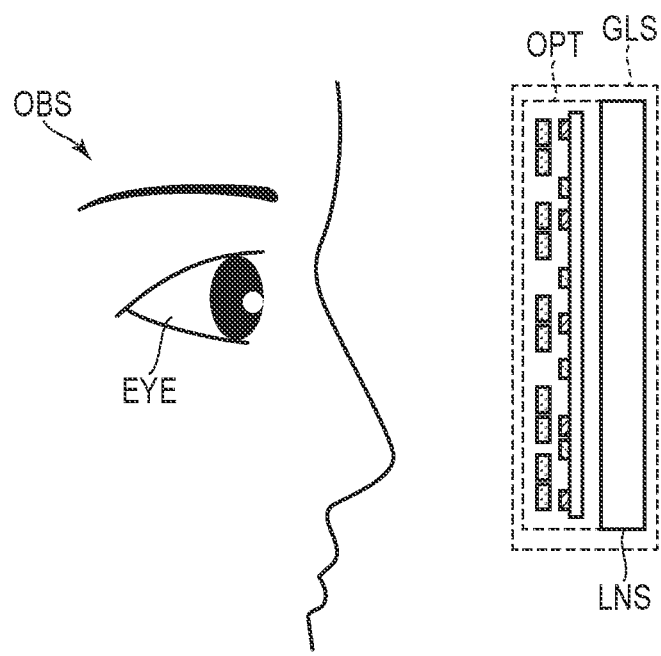
FIG. 5B is a view showing an application example of the optical element.

FIG. 5A and FIG. 5B show application examples of the optical element OPT. FIG. 5A is a view showing an electronic device for virtual reality (VR). FIG. 5B is a view showing an eyeglass-type electronic device.

The electronic device ERP shown in FIG. 5A includes the optical element OPT and the display device DSP. Although not shown to make the figure easy to see, the optical element OPT is provided for each of right and left eyes of an observer OBS. The display device DSP may be one display device which displays two different images corresponding to the right and left eyes of the observer OBS. Alternatively, two display devices displaying images corresponding to the respective right and left eyes of the observer OBS may be provided. The display device DSP and the optical element OPT are connected by wiring lines (not shown) to send and receive input signals and output signals to and from each other.

The electronic device ERP implies a head-mounted display (HMD) that is mounted on a head of the observer OBS, an eyeglass-type device, and the like. The electronic device ERP is used to provide the observer OBS with, for example, virtual reality (VR) and augmented reality (AR).

The optical element OPT included in the electronic device ERP can detect the change in the position of the eyeball EYE, i.e., change in the line of sight of the observer OBS as described above. It is possible to allow the observer OBS to feel virtual reality by changing the images displayed on the display device DSP in accordance with the movement of the line of sight of the observer OBS.

Near-infrared light is emitted but visible light is transmitted in a region AA1 of the optical element OPT. The observer OBS can watch the images displayed on the display device DSP through the region AA1. This electronic device ERP can thereby provide the observer OBS with, for example, virtual reality (VR).

Furthermore, when the display device DSP is a transparent display, i.e., when the outside view can be seen through the display device DSP, augmented reality (AR) can also be realized. A transparent display using liquid crystal or a transparent display using the organic EL can be used as such a transparent display.

Although not shown in FIG. 5A, the display device DSP includes a plurality of pixels. Switching elements that control the liquid crystal layers or organic EL light emitting layers are included in the pixels. The resolution of the pixels may be approximately 10 times to 100 times as large as the density of the individual regions PA1 of the optical element OPT.

An eyeglass-type electronic device GLS shown in FIG. 5B includes the optical element OPT and a lens LNS. Although not shown to make the figure easy to see, the optical element OPT and the lens LNS may be provided to correspond to each of the right and left eyes of the observer OBS, similarly to FIG. 5A.

As described above, visible light is transmitted in the region AA1 of the optical element OPT. The observer OBS can watch the outside view through the region AA1. The eyeglass-type electronic device GLS can thereby provide the observer OBS with, for example, augmented reality (AR).

Figure 6:
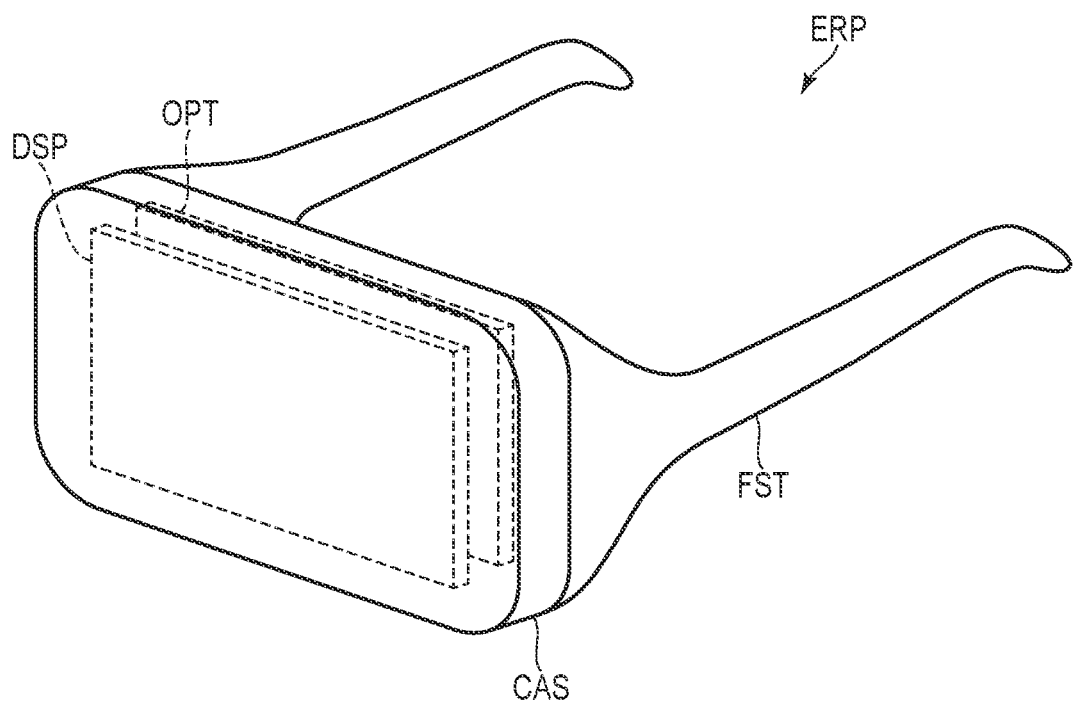
FIG. 6 is a perspective view showing the electronic device shown in FIG. 5A.

FIG. 6 is a perspective view showing the electronic device shown in FIG. 5A. The electronic device ERP includes a housing CAS and a fastening element FST. The optical element OPT and the display device DSP are built in the housing CAS. Although not shown to make the figure easy to see, wiring lines connected to the optical element OPT and the display device DSP, and a control unit which sends signals to or receives signals from the optical element OPT and the display device DSP may be provided in the housing CAS.

In the embodiment, the near-infrared light ELT emitted from the light emitting layer EML is reflected on the eyeballs EYE of the observer OBS. The reflected light ILT is made incident on the sensor layer SRL through the pinholes PH. The positional information of the eyeballs EYE included in the incident light, and the like are photoelectrically converted in the sensor layer SRL and output as electrical signals.

The pinholes PH overlap the sensor regions SA in the central region CA, but do not overlap the sensor regions SA in the peripheral region FA. The amount of offset of the center positions of the pinholes PH with respect to the center position of the sensor regions SA is larger toward the periphery.

Based on the above, the changes in the direction of the line of sight of the observer OBS can be detected. The displayed images can also be changed in accordance with the changes in the line of sight.

Configuration Example 1

Figure 7:
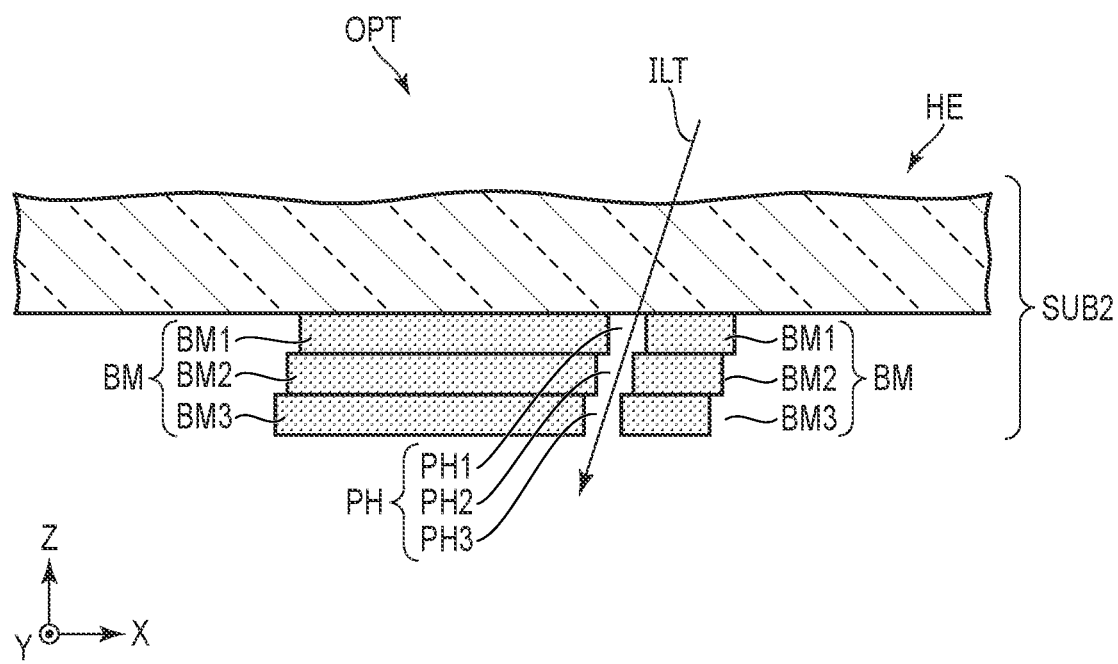
FIG. 7 is a cross-sectional view showing another configuration example of the electronic device according to the embodiment.

FIG. 7 is a cross-sectional view showing another configuration example of the electronic device according to the embodiment. The configuration example shown in FIG. 7 is different from the configuration example shown in FIG. 3 in that the pinholes are formed in a plurality of stacked light-shielding layers.

An optical path adjustment portion HE (second substrate SUB2) of the optical element OPT shown in FIG. 7 includes light-shielding layers BM1, BM2, and BM3 stacked in this order on the base material BA2. The light-shielding layers BM1, BM2, and BM3 are also referred to as a light-shielding layer BM as a whole. The light-shielding layers BM1, BM2, and BM3 may be formed of the above-described material. In this configuration example, an example of stacking three light-shielding layers will be described, but the number of light-shielding layers is not limited to this, and two layers or four or more layers may be stacked.

Pinholes PH1, PH2, and PH3 are provided in the light-shielding layers BM1, BM2, and BM3, respectively. The pinholes PH1, PH2, and PH3 are also referred to as a pinhole PH as a whole. The pinhole PH1 partially overlaps the pinhole PH2, but the other parts do not overlap. The pinhole PH2 partially overlaps the pinhole PH3, but the other parts do not overlap. The pinholes PH1, PH2, and PH3 overlap while displaced on the X-Y plane and, as a whole, constitute the pinhole PH extending obliquely in the direction (thickness direction) parallel to the third direction Z.

The obliquely extending pinhole PH allows the light ILT to be made incident with respect to the direction parallel to the third direction Z. When light ILT is made incident obliquely, the amount of light reaching the sensor layer SRL increases, resulting in greater sensitivity.

In this configuration example, the same advantages as those of the embodiment can also be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical device comprising:
   a first substrate;
   a second substrate provided to overlap the first substrate;
   a plurality of light emitting regions for emitting near-infrared light on the first substrate;
   a plurality of sensor regions for detecting the near-infrared light on the first substrate;
   a light shielding region, and a plurality of pinholes provided in the light shielding region on the second substrate;
   a plurality of first individual regions each including one of the plurality of sensor regions, the light shielding region, and one of the plurality of pinholes; and
   a plurality of second individual regions each including one of the plurality of light emitting regions, wherein
   the plurality of first individual regions and the plurality of second individual regions are disposed alternately,
   an individual region (A) is in a central region of the plurality of first individual regions,
   an individual region (B) and an individual region (C) are in a peripheral region of the plurality of first individual regions,
   the individual region (C) is further from the central region than the individual region (B),
   a pinhole overlaps with a center portion of the sensor region in the individual region (A),
   the pinhole does not overlaps with the center position of the sensor region in the individual region (B),
   the pinhole does not overlaps with the center position of the sensor region in the individual region (C), and
   a distance between the pinhole and the center position of the sensor region in the individual region (C) is longer than that in the individual region (B) in a planar view.

2. The optical device according to claim 1, wherein
   the light shielding region includes a plurality of light shielding layers, a first pinhole provided in one of the plurality of light shielding layers, and a second pinhole provided in another of the plurality of light shielding layers,
   the one of the plurality of pinholes includes the first pinhole and the second pinhole,
   the first pinhole and the second pinhole are displaced from each other in the planar view, and
   a line connecting a center of the first pinhole with a center of the second pinhole extends obliquely to a thickness direction of the second substrate.

3. The optical device according to claim 1, further comprising:
- a display panel, wherein
  - the first substrate, the second substrate, and the display panel are overlapped each other.

4. The optical device according to claim 3, wherein
- the first substrate is located between the second substrate and the display panel.

5. The optical device according to claim 1, further comprising:
- a lens, wherein
  - the first substrate, the second substrate, and the lens are overlapped each other.

6. The optical device according to claim 5, wherein
- the first substrate is located between the second substrate and the lens.

\* \* \* \* \*